United States Patent
Bordt et al.

(12)

(10) Patent No.: US 6,427,490 B1
(45) Date of Patent: Aug. 6, 2002

(54) METHOD FOR PRODUCING CONES OF PICTURE TUBES AND DEVICE FOR CARRYING OUT THIS METHOD

(75) Inventors: Heinz-G. Bordt, Bischofsheim; Georg Sparschuh, Aspisheim, both of (DE)

(73) Assignee: Schott Glas, Mainz (DE)

( * ) Notice: Subject to any disclaimer, the term of this patent is extended or adjusted under 35 U.S.C. 154(b) by 0 days.

(21) Appl. No.: 09/622,077

(22) PCT Filed: Jan. 29, 1999

(86) PCT No.: PCT/EP99/00522
§ 371 (c)(1),
(2), (4) Date: Aug. 11, 2000

(87) PCT Pub. No.: WO99/42412
PCT Pub. Date: Aug. 26, 1999

(30) Foreign Application Priority Data

Feb. 20, 1998 (DE) .......................... 198 07 061

(51) Int. Cl.⁷ ............................................. C03B 11/10
(52) U.S. Cl. .............................. 65/68; 65/305; 65/323; 425/218; 425/422; 425/442
(58) Field of Search ............................ 65/68, 305, 323; 425/218, 406, 441, 442, 443, 436, 422

(56) References Cited

U.S. PATENT DOCUMENTS

| 3,078,696 A | * | 2/1963 | Torok ........................... 65/356 |
| 3,264,080 A | * | 8/1966 | Mayhew et al. ............... 65/306 |
| 3,298,813 A | * | 1/1967 | Vogelpohl ..................... 65/305 |
| 3,322,522 A | * | 5/1967 | Meiresonne .................. 445/45 |
| 3,399,799 A | | 9/1968 | Meiresonne ............. 220/2.1 A |
| 3,775,082 A | * | 11/1973 | Carpenter ..................... 65/162 |
| 5,865,884 A | * | 2/1999 | Segawa et al. .............. 106/243 |

FOREIGN PATENT DOCUMENTS

| DE | 298 04 371 U | 7/1998 |
| FR | 2 260 540 A | 9/1975 |

* cited by examiner

*Primary Examiner*—Sean Vincent
(74) *Attorney, Agent, or Firm*—Michael J. Striker

(57) ABSTRACT

Funnels of picture tubes are typically produced by pressing a molten gob of glass in a mold using a pressing die and by using a ring resting on the mold and resiliently secured to the die, for molding a flat funnel upper edge. At the same time, through corresponding recesses in the mold, bearing faces, so-called pads for connecting the funnel adjustably to the picture screen, are molded onto the outer collar of the funnel. In order to attain an encompassing upper edge of constant width by recessing of the pads without an encompassing mold seam on the finished funnel, the mold is provided in the region of the pads with recesses, in which movable, flat molded parts that are flush with the upper edge of the mold can be placed, the thickness of the molded parts being determined in accordance with the extent of recessing of the pads and their radial length being determined such that they produce protrude into the mold cavity in accordance with the recessed upper edge of the pads to be molded on, and are arranged such that they can be moved out of the mold cavity after the funnel has been molded.

8 Claims, 5 Drawing Sheets

Figure 1B:
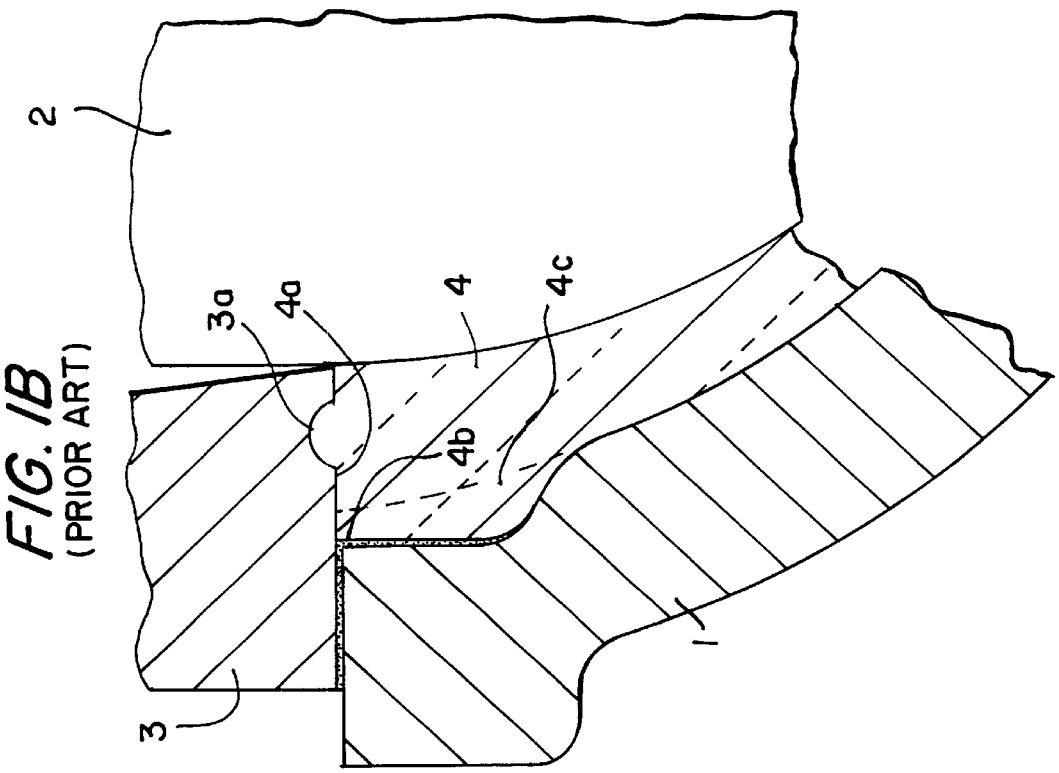

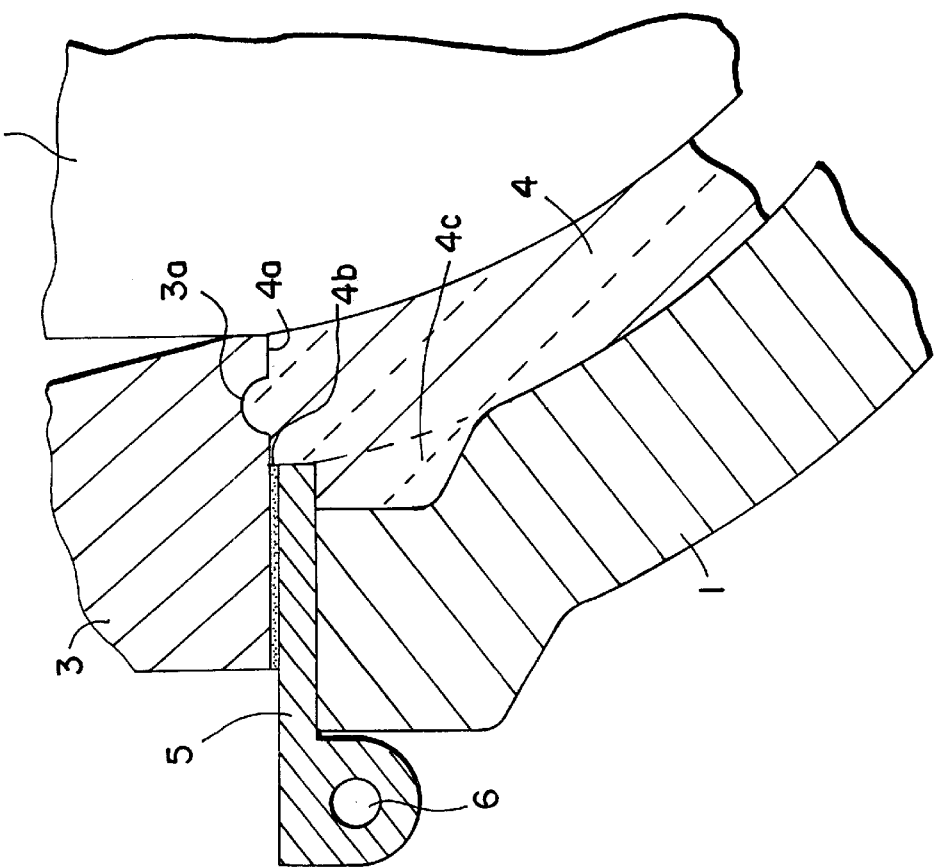
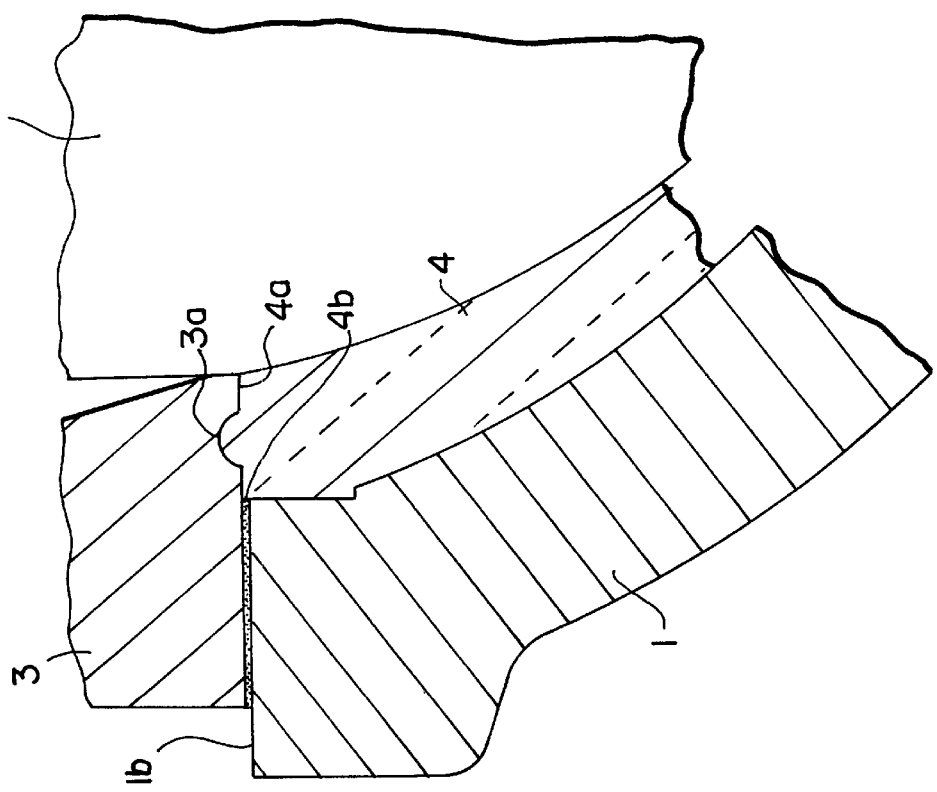

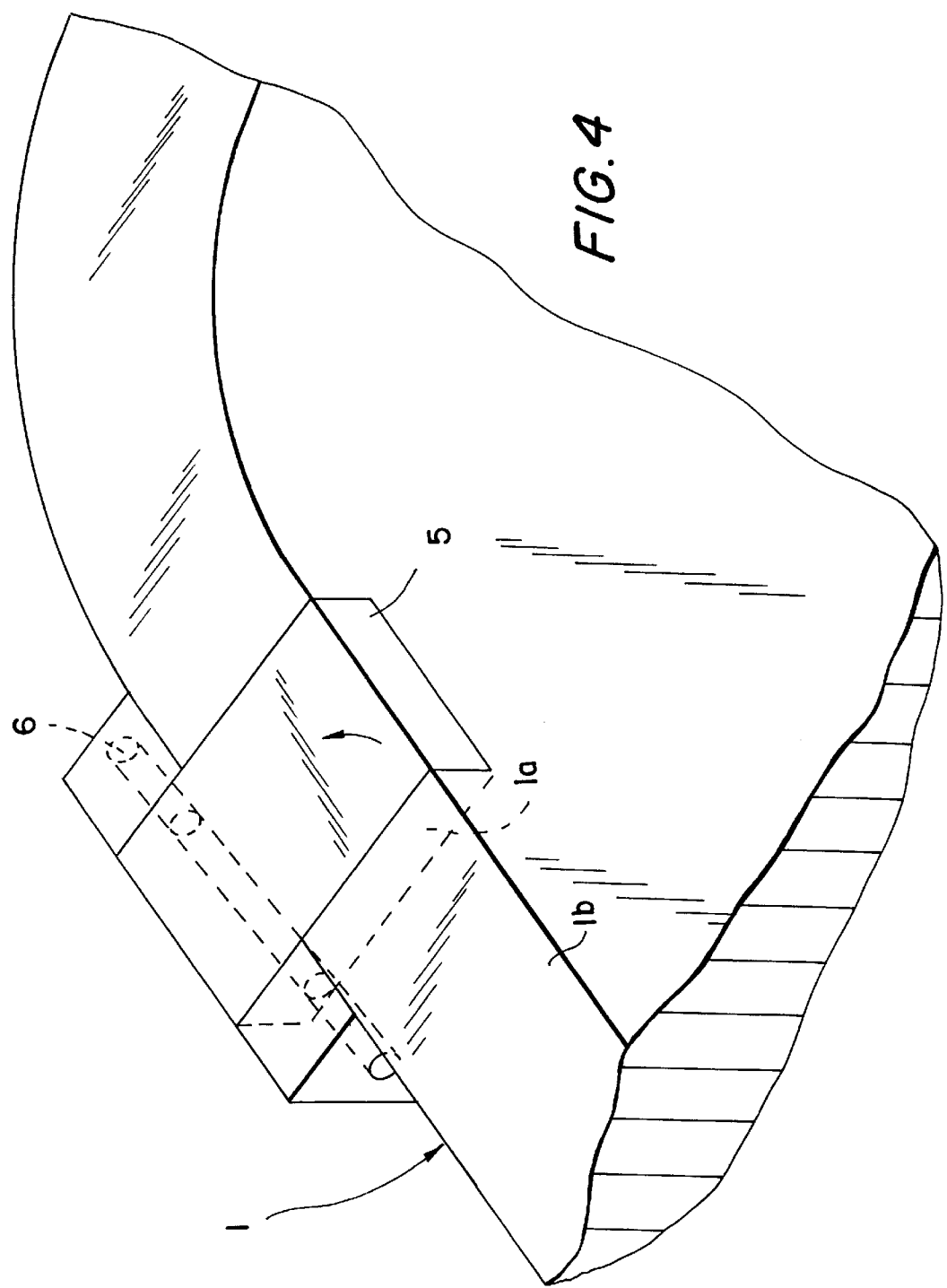

FIG. 5A (PRIOR ART)
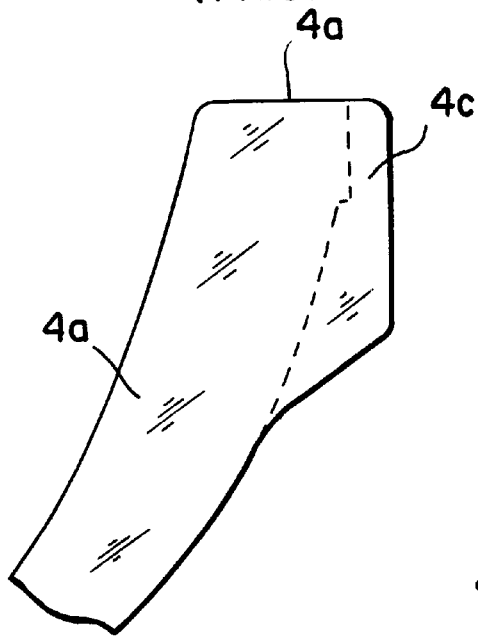
FIG. 5B (PRIOR ART)
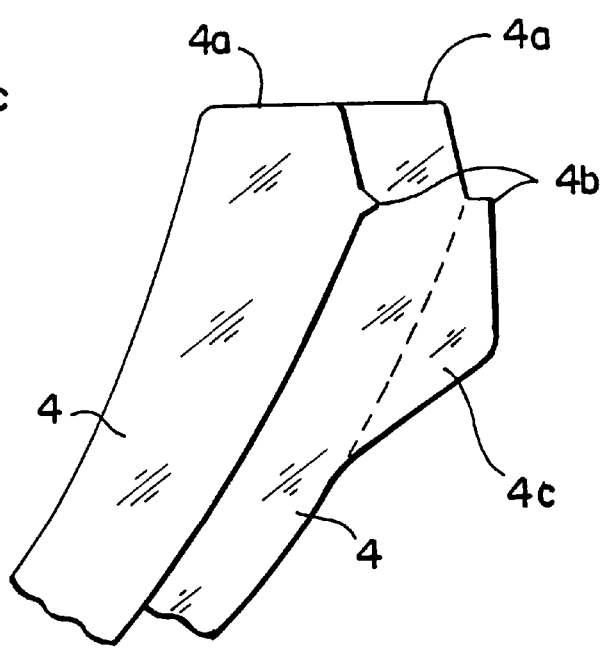
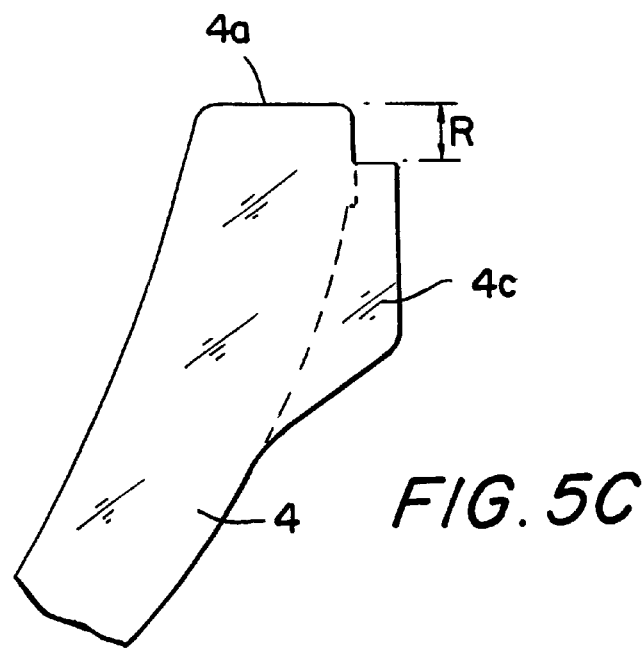
FIG. 5C

METHOD FOR PRODUCING CONES OF PICTURE TUBES AND DEVICE FOR CARRYING OUT THIS METHOD

The invention relates to a method for producing funnels of picture tubes with adjustment bearing faces (pads) molded on by the pressing technique, having the following steps:

delivering a molten gob of glass to a mold corresponding to the outer contour of the blank, pressing the gob of glass, by means of a die that predetermines the inner contour of the blank and by means of a ring resiliently secured to the die and resting on the mold, to form the funnel with a flat encompassing upper edge and molded-on pads.

The invention also relates to an apparatus for producing funnels of picture tubes with molded-on adjustment bearing faces (pads) by pressing, having a mold, which has a mold surface corresponding to the outer contour of the blank, including recesses for the pads, and into which a molten gob of glass can be delivered, a pressing die, which predetermines the inner contour of the blank and on which a ring, resting flatly on the mold, is resiliently retained for molding the flat upper edge of the funnel.

Picture tubes, especially television tubes or tubes for computer monitors, are composed in terms of glass of three separately made glass parts, namely the actual screen, then the back part of the picture tube, which is called a funnel, and finally the neck of the picture tube for receiving the beam system.

In the manufacture of the picture tubes, the funnel, on whose collar an encompassing plane connecting face—also known as the soldering edge—is formed, is joined to the screen, on which a corresponding soldering edge is formed, in vacuum-tight fashion with the aid of glass solder. The pastelike glass solder is applied to the soldering edge of the funnel. The funnel is placed in an obliquely disposed metal frame, with the soldering edge facing upward. The screen is placed with its soldering edge facing downward onto the glass solder. In the ensuing tempering process, the solder melts, and the funnel and screen join to make the tube.

For the function of the picture tube, an exact alignment of the funnel with the screen is necessary; a misalignment causes an offset of the beam system, located in the neck of the funnel, relative to the screen surface. To assure the alignment during the melting process, typically three raised bearing faces, so-called pads, are molded onto the funnel in the region of the collar. The screen is likewise provided with three bearing faces. The bearing faces on the screen and on the funnel are assigned bearing points in the metal frame. The inclined position assures that the screen and funnel will rest on the bearing faces, and thus that a defined alignment of the funnel and screen will be achieved.

After that, the picture tube neck is molded by known methods onto the other end of the funnel.

This technology of picture tube manufacture is prior art and is described in relevant publications, so that no further description of this is needed here.

The invention pertains to the production of the funnel. For manufacturing these funnels, the pressing technique is employed in a known manner, the world over. Molten gobs of glass are pressed into funnels, using the typical shaping tools of a mold, a ring, and pressing dies. Typically, round table presses are employed, in which from 11 to 15 structurally identical molds are mounted on the pressing table. The molds are transported to the next processing step with each increment of the press.

The outside of the funnel is shaped with the mold, and the inside is shaped with the pressing die.

For molding the terminal edge of the funnel, the third tool, the ring, is needed. The ring is placed on the mold before the pressing operation, and during the pressing is pressed onto the mold by spring force. Once the glass gob has been loaded into the mold, it is pressed out in the pressing station with the aid of the downward-moving die, under a strong pressing force. The die and the ring are manufactured to fit very precisely. Given a sufficient pressing force, the void of the three tools is completely filled with glass, and typically a mold seam forms between the ring and the mold. This mold seam must be located on the greatest circumference of the funnel, to allow both the ring and the mold to be unmolded. When the die is moved upward, the ring also takes on the function of stripping off the glass part.

At subsequent cooling stations, the pressed-out funnel is cooled enough that the product can be removed at the ensuing removal station without being deformed.

Before being removed, the ring, because it covers the funnel at the top, must be removed from the mold.

It is known to that end to mount the ring firmly with the pressing die in the pressing station via a spring plate. The ring is then pressed onto the mold in the downward motion of the die and in the upward motion, after the spring travel has been overcome, the ring is removed. In this technique, only one ring remaining in the pressing station is in use. In the European method, a ring that is flat toward the mold is placed on the mold. The mold seam is therefore created at the upper edge of the funnel. Since during the final machining following the hot shaping, the pressed upper edge of the funnel is ground and chamfered to make a plane surface known as the soldering edge, the mold seam is also ground in the process and is then no longer, present on the finished funnel. The potential risk that operational problems such as cracking or even implosion will originate in this mold edge is therefore absent in the picture tubes made by the European method.

As already noted, the so-called pads must be present on the funnel in its outer collar region. These raised pads are typically jointly molded on in the process of pressing the funnel. To that end, the mold has corresponding recesses in the region of the pads.

Because of the unmolding conditions described, it is absolutely necessary that the raised pads, in the funnels made by the European method, be drawn as far as the soldering edge, because otherwise undercuts would be made in the mold that would prevent unmolding.

A disadvantage of the pads drawn as far as the soldering edge is that the soldering edge in this portion is widened by the extent to which the pads are raised; that is, the soldering edge is no longer the same width all the way around. When the funnel is joined to the screen, surface effects can make the glass solder in these regions extend nonhomogeneously compared to the remaining soldering edge, thus creating a flaw, and increased stresses can arise.

Figure 1A:
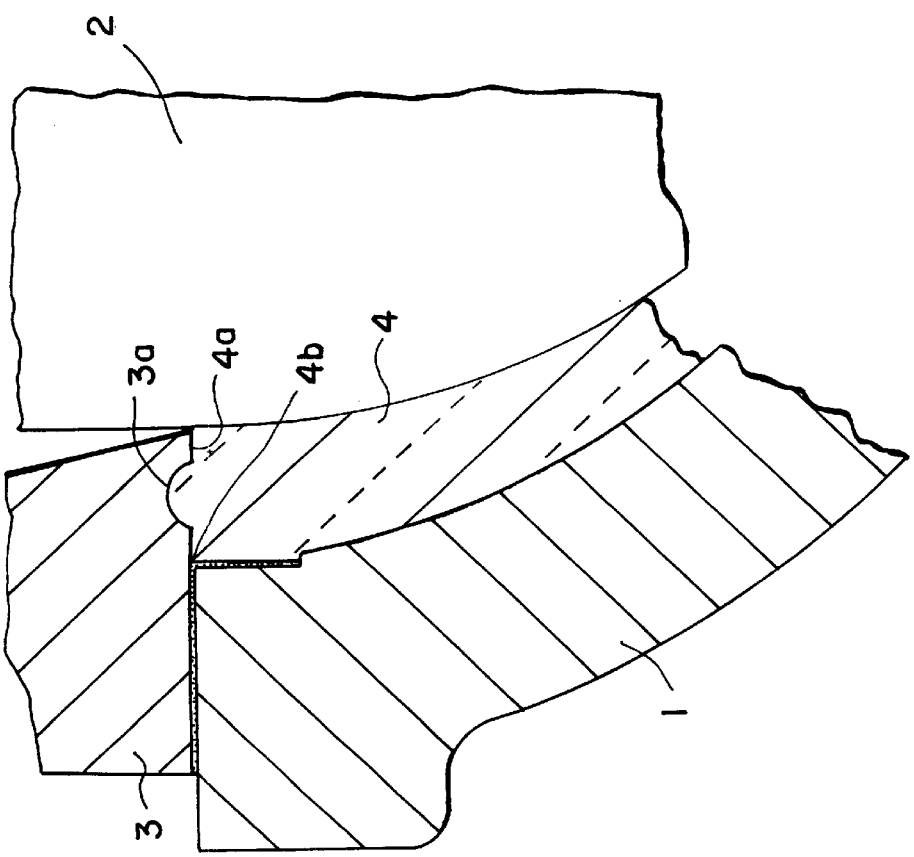

FIG. 1, in two fragmentary views, schematically shows this known shaping of the collar region of the funnel in the pressing process, specifically in part A in a sectional view in the collar free of pads and in part B with a sectional view in the pad region.

The glass funnel 4 is created between a mold 1, the pressing die 2 that has entered it, and the ring 3 resting on the mold 1. The shaping tools described are shown only schematically, for the sake of simplicity.

The ring 3 typically has an encompassing groove 3a, which serves to provide stability to the molded funnel while it is still in the plastic state; this groove is later ground away in the course of the plane grinding of the upper edge 4a of the funnel to the soldering edge, including the mold edge 4b that is necessarily created in this technology between the ring 3 and the mold 1.

As can be seen from the comparison between parts A and B, the upper edge 4a in the region of the raised pads 4c (part B) is wider by the extent to which the pads are raised than in the pad-free collar region (view B); for the sake of better illustration, the pad region 4c is marked off by a dashed line from the contour of the funnel 4. After the final machining, a so-called pad design as shown in FIG. 5, part A, results, with a raised pad 4c on the soldering edge 4a without any mold seam.

Figure 2B:
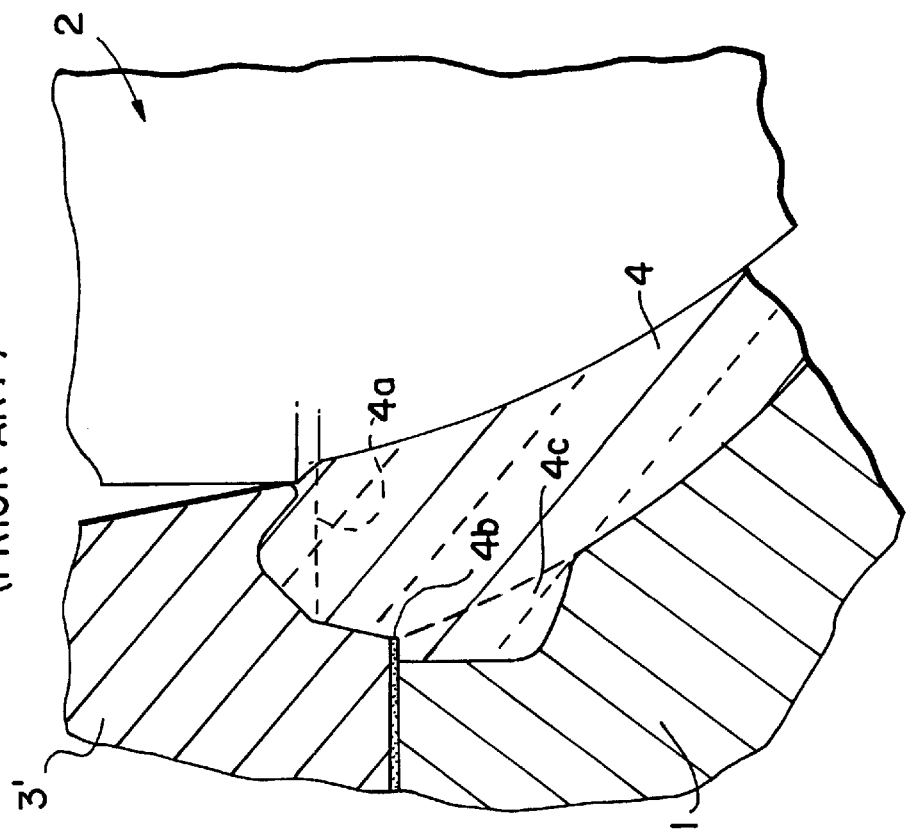
Figure 2A:
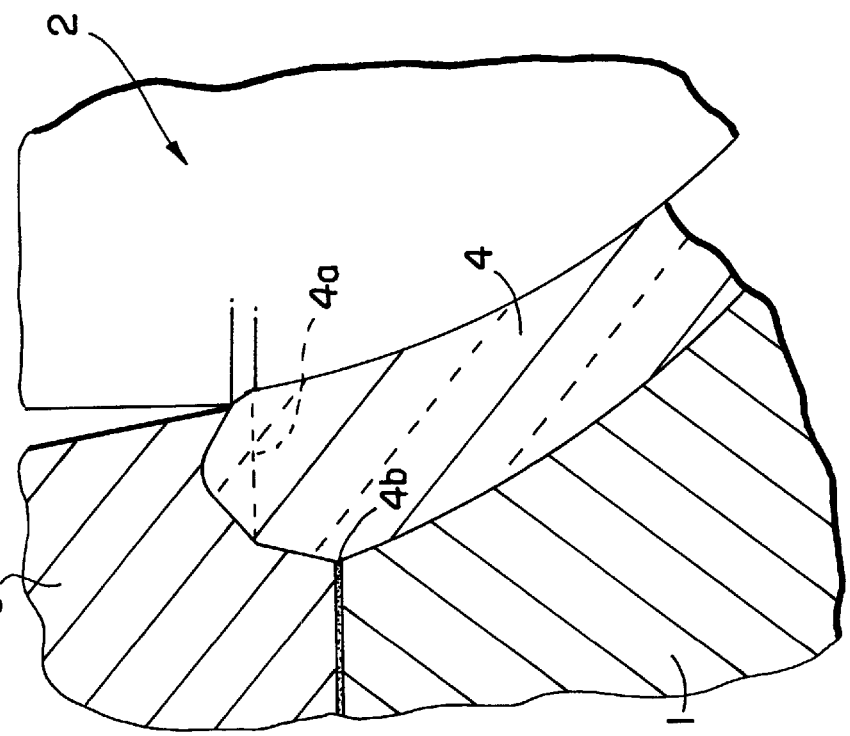

A technique is also known—hereinafter called the Asiatic method—that in the pressing of the funnel 4 creates an upper edge 4a of the same width all the way around. The pressing operation by this method is shown in FIG. 2 in fragmentary views corresponding to FIG. 1.

In the Asiatic method, the collar of the funnel is molded entirely in the ring 3'. In contrast to the ring 3 of FIG. 1 for the European method, the ring 3' therefore has not a flat underside but rather a three-dimensional contour that embraces the collar region. More recent Asiatic methods use ring that is joined to the pressing die via a spring plate, as already described above. However, older methods are also known in which there are a plurality of rings, which are manipulated using a ring repositioner. In each case, however, the collar of the funnel is molded in the ring 3', which comes into contact with the glass.

In the funnels made by this Asiatic method, the pads 4c can be recessed into the plane between the soldering edge and the mold seam, because this region is molded in the ring 3'. No undercuts are therefore created, and the soldering edge 4a is also molded with the same width all the way around, yet nevertheless problems do arise because of the mold seam 4b.

Because of tool tolerances and the remaining gap between the shaping parts, that is, the mold and the ring, the mold seam 4b is embodied as an encompassing bead that is typical for tool seams. This outer encompassing mold seam 4b is located a few millimeters below the final edge 4a. It is true that the funnel edge 4a is ground in the Asiatic method as well. However, the mold seam 4b is located so far below this edge that it is no longer removed in the grinding process. It is therefore still present in the finished product. This mold seam is a weak point of the product, because it is located exposed on the largest circumference of the later picture tube, and the tube as a consequence of the evacuation is under high stress. If the encompassing mold seam is hit, there is the risk of cracking and implosion.

An additional disadvantage of the Asiatic method is the complicated production of the rings 3'. While the rings 3 required for the European method are merely ground in the bearing face, the rings 3' for the Asiatic method must be complicatedly milled in a three-dimensional contour. The encompassing contour of the ring 3' in the quasi-vertical part must match very well to the contour of the mold 1, and the thermal expansions resulting from different temperatures of the tools must be taken into account by means of specified dimensions.

The demand for an exact alignment of the mold in the ring is also more stringent in the Asiatic method; any mismatch widens the mold seam 4b, with the negative effects described.

For adherence to the required tolerances, the ring 3' in the Asiatic method must be aligned with the applicable mold using guide wedges. Since in order to match the required socket, the die 2 must be guided exactly in the ring, the additional wedge guidance between the ring and the mold creates an overdetermined system. To avoid damage to the press and the tools, the press die must be supported in floating fashion in the press. The result is a much more complicated design of the pressing station than in the European method, in which the die can be mounted in fixed fashion in the pressing station.

The object of the invention, based on the European method, is to refine the European method such that molding of pads recessed below the upper edge and thus molding of an upper edge of constant width all the way around is possible without an encompassing mold seam.

On the basis of the method defined at the outset, this object is attained for this by providing that at least in the step of pressing into the mold, movable flat molded parts are placed in the region of the pads, flush with the upper edge of the mold, the thickness of which molded parts predetermines the extent of recessing of the pads, and which molded parts protrude into the mold cavity in accordance with the recessed upper edge of the pads that is to be molded on and are moved out of the funnel after the funnel has been molded.

With the apparatus defined at the outset as the point of departure, this object is attained for the apparatus in that the mold, in the region of the pads, is provided with recesses into which the movable flat molded parts that are flush with the upper edge of the mold can be placed, the thickness of which molded parts is determined in accordance with the extent of recessing of the pads and whose radial length is determined such that they protrude into the mold cavity in accordance with the recessed upper edge, to be molded on, of the pads, and are disposed such that after the funnel has been molded, they can be moved out of the mold cavity.

During the pressing operation, the movable molded parts put in place are held in position by the contact pressure of the ring. In the ensuing unmolding operation, the funnels can be unmolded by raising or displacing the movable molded parts, despite the undercut in the region of the pads.

The mold seam is located in the region of the upper edge of the funnel and can therefore be removed in the course of the plane grinding of the upper edge down to the soldering edge. With the invention, the advantages of the European and the Asiatic method can therefore be said to be combined: pads recessed from the upper edge, that is, into an encompassing constant width of the upper edge, but without an encompassing mold seam, with a simple tool design and simple pressing technology.

With regard to their actuation, the movable molded parts can be externally actuated, such as by means of compressed air or hammering on the pressing die, or self-actuated, that is, by actuations in the pressing operation itself. Precisely the latter feature has advantageous significance, since no additional elements are needed.

In accordance with a further feature of the invention, the molded parts that can be put in place can be disposed displaceably in the mold. They are then preferably embodied as externally actuated bars or rotary slides.

Particular advantages are attained in accordance with a feature of the invention if the molded parts that can be put in place are pivotably connected in raisable fashion to the mold, particularly in the form of flaps, which are pivotably connected to a shaft on the outside of the mold. In this embodiment of the movable molded parts in the form of flaps, it is possible for the flaps to be raised by the funnel itself during the unmolding process and after the unmolding to drop by gravity, that is, automatically, back into the position of repose.

In this version, to great advantage, no further devices or changes in the mold and the press are needed.

It is understood for one skilled in the art that the movable molded parts can also be embodied and actuatable in some other way than that described above.

The invention will be described in further detail in terms of an exemplary embodiment shown in the drawings. Shown are:

FIG. 1, two fragmentary sections through the pressing tools in the region of the collar of a funnel of a picture tube in the known European method;

FIG. 2, two corresponding fragmentary sections in shaping by the known Asiatic method;

FIG. 3, two fragmentary sections corresponding to FIGS. 1 and 2 for shaping by the method of the invention;

FIG. 4, a schematic illustration of a version of the movable molded parts that can be put in place, in the form of self-actuatable flaps; and FIG. 5, in parts A, B, C, the pad designs for the three methods described.

FIG. 3, corresponding to what has already been described for FIGS. 1 and 2, shows a schematic fragmentary section through a pressing mold 1, a pressing die 2, and a ring 3, as well as the funnel 4 pressed from a molten gob of glass previously placed in the mold 1. The ring 3 is firmly joined to the die 2 in a known manner via a spring plate. As the die 2 is driven downward into the mold 1, the ring is pressed onto the mold, forming the upper edge 4a of the funnel. The mold 1, also, as in the European method, has recesses for pads 4c. Since to this extent the method of the invention agrees with the European method described in conjunction with FIG. 1, reference may be made to the latter description here. The difference from the known European method resides in the molding of the pads 4c. FIG. 3 part A is therefore identical to FIG. 1 part A. In contrast to the version of FIG. 1b, with the pad 4c raised up to the upper edge of the mold, in the embodiment of the pressing apparatus according to the invention and shown in FIG. 3B and in the view of FIG. 4, the mold 1 has a recess 1a in the region of the pads 4c, into which recess a movable flat molded part that is flush with the upper edge 1b of the mold, the molded part in this exemplary embodiment being in the form of a flap 5 pivotably and rotatably connected to the mold 1 via a shaft 6, can be placed.

As can be seen particularly from FIG. 3B, the molded-on pad 4c is offset at the bottom, that is, undercut, from the upper edge 1b of the mold 1, and thus from the later soldering edge 4a, by the thickness of the emplaced molded part. The radial length of the molded part 5 is determined such that in accordance with the upper edge 4d of the pads 4c that is to be molded on, it protrudes into the mold cavity between the mold 1 and die 2.

Because of the pivotable connection of the flaps 5 to the mold 1, it is assured in a simple way that during the unmolding operation, the flaps can be raised, uncovering the mold cavity, by the molded, raised funnel and after the unmolding drop back automatically to the outset position of FIG. 4 by gravity.

The described embodiment advantageously simply allows the production of undercut pads in accordance with the design of FIG. 5c, which are recessed by the dimension "R" relative to the soldering edge 4a, without any encompassing mold seam 4b remaining on the finished machined funnel, because that seam can be ground away in the process of the grinding of the upper edge in whose vicinity it is located.

The mold seams, determined by the geometry of the molded parts, are created solely in the region of the pads, in the method of the invention. The mold seams remain short and are hardly visible, because the molded parts are fixed to the mold, preferably comprise material having the same thermal expansion as the mold, and furthermore are pressed by the pressing force transmitted via the ring 3. Any offset in the region of the seam is virtually entirely precluded; the outer contour of the funnel 4 is formed solely by the mold 1 and the emplaced molded parts 5. They have a fixed relationship and during use assume virtually the same temperature.

This is not the case in the Asiatic method, since the mold 1 and the ring 3' are not fixedly associated and undergo a different energy input, and consequently, because of the different thermal expansion of the ring 3' and the mold 1, a considerable offset often ensues.

Independently of the Asiatic and European methods, the pads are either made oversized in a known manner and then ground to the exact dimension in an ensuing grinding process or are pressed directly to the rated dimension, "as pressed pads", as it were. The invention is applicable to both methods without restriction.

The invention is also applicable if the chamfering of the edge or grinding of the upper edge by pressed-on chamfers or solder faces pressed to size ("as pressed solder faces") are employed.

The invention is in principle not limited to the product described. It can be used in all pressed glass production processes in which undercuts in the region of the mold and ring seam are needed on the product.

What is claimed is:

1. A method for producing funnels of picture tubes with pads molded on by the pressing technique, having the following steps:

delivering a molten gob of glass to a mold corresponding to the outer contour of a funnel, pressing the gob of glass, by means of a die that determines the inner contour of the funnel and by means of a ring resiliently secured to the die and resting on the mold, to form the funnel with a flat encompassing upper edge and molded-on pads, characterized in that at least in the step of pressing movable flat molded parts are recessed in the mold in the region of the pads, flush with the upper edge of the mold, such that the molded parts protrude into the mold cavity and determine a recessed upper edge of the pads upon pressing and are moved out of the funnel after the funnel has been pressed.

2. The method of claim 1, characterized in that the movable molded parts are externally actuated.

3. The method of claim 1, characterized in that the movable molded parts are self-actuated.

4. An apparatus for producing funnels for picture tubes with molded-on pads by pressing, having a mold which has a mold surface corresponding to the outer contour of the funnel including recesses for the pads and into which a molten gob of glass can be delivered, a pressing die which determines the inner contour of the funnel and on which a ring is resiliently retained for molding the flat upper edge of the funnel, characterized in that the mold in the region of the pads is provided with recesses into which the movable flat molded parts that are flush with the upper edge of the mold are placed such that they protrude into the mold cavity and determine a recessed upper edge to be molded onto the pads and are arranged such that after the funnel has been molded they can be moved out of the mold cavity.

5. The apparatus of claim 4, characterized in that the molded parts are disposed displaceably in the mold.

6. The apparatus of claim 5, characterized in that the molded parts are pivotably connected in raisable fashion to the mold.

7. The apparatus of claim 6, characterized in that the molded parts are embodied as flaps which are pivotably connected on the outside of the mold to a shaft in such a way that during an unmolding operation they can be raised out of the mold cavity by the molded, raised funnel and after the unmolding drop automatically by gravity back into the the mold cavity.

8. The apparatus of claim 4, characterized in that the movable molded parts comprise a material having the same coefficient of thermal expansion as the material of the mold.

* * * * *